United States Patent [19]

Bernatz et al.

[11] Patent Number: 4,824,680

[45] Date of Patent: Apr. 25, 1989

[54] NON-STALING GUM COMPOSITION WITH IMPROVED WRAPPABILITY

[75] Inventors: Kevin J. Bernatz, Hickory Hills; Ron W. Pillsbury, Downers Grove, both of Ill.

[73] Assignee: Wm. Wrigley, Jr. Company, Chicago, Ill.

[21] Appl. No.: 196,129

[22] Filed: May 19, 1988

[51] Int. Cl.⁴ ............................................. A23G 3/30
[52] U.S. Cl. ..................................... 426/3; 426/804
[58] Field of Search ..................................... 426/3-6, 426/804

[56] References Cited

U.S. PATENT DOCUMENTS

| | | | |
|---|---|---|---|
| 3,632,358 | 1/1972 | Echeandia et al. | 426/3 |
| 4,166,134 | 8/1979 | Witzel et al. | 426/3 |
| 4,187,320 | 2/1980 | Koch et al. | 426/3 |
| 4,208,431 | 6/1980 | Friello | 426/3 |
| 4,217,368 | 8/1980 | Witzel et al. | 426/3 |
| 4,238,475 | 12/1980 | Witzel et al. | 426/3 |
| 4,388,328 | 6/1983 | Glass | 426/3 |

*Primary Examiner*—Jeanette Hunter
*Attorney, Agent, or Firm*—Willian Brinks Olds Hofer Gilson & Lione Ltd.

[57] ABSTRACT

A method of producing a sugar based chewing gum having good non-staling properties and improved wrappability is disclosed. The method includes the steps of mixing about 15 to about 35 parts by weight gum base with about 50 to about 80 parts by weight sugar, about 5 to about 30 parts by weight corn syrup, about 0.25 to about 2.0 parts by weight powdered sorbitol, effective amounts of flavor and optional color and other ingredients. The method requires that the sorbitol be mixed with the gum base prior to the time when more than one-half of the sugar is mixed with the gum base.

18 Claims, No Drawings and loses moisture is minimized. The reduction in the rate of moisture gain results in less sweating and sticking of the gum to the wrappers. Further, the delayed moisture loss results in a gum that is not as brittle or stale-tasting, and which has improved shelf life.

NON-STALING GUM COMPOSITION WITH IMPROVED WRAPPABILITY

FIELD OF THE INVENTION

The present invention relates to a method of producing non-staling chewing gum compositions with improved wrappability and the compositions themselves.

BACKGROUND OF THE INVENTION

Chewing gum generally contains gum base, an aqueous softener (such as corn syrup), a sweetening and bulking agent and flavor. Optional color and processing aid ingredients are also well known.

Chewing gum is generally prepared by mixing the gum base with the aqueous softening agent for three to five minutes, followed by the addition of solid sweetener and flavor. The gum is removed from the mixer, rolled and cut to the desired shape.

It is also well known that chewing gum has the tendency to get stale. Where the ambient relative humidity is less then the equilibrium relative humidity (ERH) of the composition, moisture is lost from the gum. After time, the gum becomes stale and brittle.

Various suggestions have been made for overcoming this problem. U.S. Pat. No. 4,166,134 to Witzel et al. ("Witzel") discloses a gum composition containing a humectant, which increases the ERH of the gum. Witzel discloses sugar alcohols as humectants, sorbitol being preferred. Also, Witzel states that the sugar alcohol should be about 2% to about 50% of the gum composition. Witzel also states that the humectant is to be effectively separated from the aqueous softener, and discloses a method wherein the sorbitol is added after first mixing the gum base and aqueous softener mixture with the sweetener. In fact, Example 8 of Witzel compares two gum compositions with identical ingredients, including 10% sorbitol, 17% corn syrup and 50% sugar. The Example 8 sample is produced with the sorbitol being added after the sugar, and in the control sample the sorbitol is mixed before the sugar is added. It was reported that after 72 hours of storage at 100° F., the control samples had severe sweating and stuck together, while the Example 8 samples were easily separated, displaying good sweat resistance.

U.S. Pat. No. 3,632,358 to Enchandia et al. ("Enchandia") discloses a method of making chewing gum in which glycerin is added in an amount from about 0.1 to about 1% by weight of the gum. The glycerin is added after two-thirds of the sugar is mixed in. Glycerin is a liquid and has known humectant properties. In fact, the tendency of glycerin to attract water is so strong that it is often considered a desiccant.

Prior to the discovery of the present invention, applicants' assignee was making and selling a gum composition containing gum base, corn syrup, sugar and a small amount (less than about 1%) of sorbitol. The sorbitol was added to the gum composition after the sugar had been mixed with the gum base and corn syrup. This small amount of sorbitol was found to improve the long-term flexibility of the gum, although it did not significantly affect the ERH of the gum. However, the gum that was produced was found to be excessively soft and was difficult to wrap after a typical 24-hour cool down period between the rolling/scoring operation and the wrapping operation.

BRIEF DESCRIPTION OF THE INVENTION

The present invention provides an improvement to the method of producing chewing gum which results in a gum with improved wrappability. The general method comprises the steps of mixing about 15 to about 35 parts by weight of a gum base with about 50 to about 80 parts by weight sugar, about 5 to about 30 parts by weight corn syrup, effective amounts of flavor and optional color and other ingredients. The improvement comprises the step of mixing about 0.25 to about 2.0 parts by weight of powdered sorbitol with the gum base prior to mixing more than one-half of the sugar into the gum composition. In this improved process, the sorbitol is initially enrobed by the gum base.

It was found that such a procedure produced a gum which had sufficient firmness after the typical 24-hour cool down period before wrapping that it could be easily wrapped and did not have dimensional stability problems encountered with the gum produced with the sorbitol added after the sugar. It was also found, however, that after being wrapped in standard wrappers (water permeable), the gum produced by the improved method still presented the desired non-staling qualities.

DETAILED DESCRIPTION OF THE INVENTION AND ITS PREFERRED EMBODIMENT

The present invention is intended for use in gums which comprise primarily sugar and gum base, irrespective of the type of gum base. As used herein, the term chewing gum thus includes both chewing gum and bubble gum compositions. The term sugar generally refers to sucrose, but also contemplates mixtures of sucrose and up to 50% of dextrose, fructose or mixtures thereof.

The invention encompasses the use of many conventional gum ingredients and process steps. The basic gum manufacturing process described on page 1 can be used, with the additional considerations outlined herein. The levels of ingredients to be used in the method of the invention are as follows:

| | |
|---|---|
| gum base | 15–35% |
| sugar | 50–80% |
| corn syrup | 5–30% |
| sorbitol | 0.25–2% |

Of course, optional and effective amounts of flavors, colors and processing aids may be added, as well as trim gum from previous batches.

As part of the invention, the sorbitol must be added prior to adding more than about one-half of the sugar used in the formulation, and preferably before more than one-third of the sugar is added. The sorbitol will preferably be used at a level in the range of about 0.5 to about 1.25%, and most preferably in the range of about 0.65 to about 0.95%. Compared to the sugar content, the ratio of sugar to powdered sorbitol will preferably be greater than about 30:1, and most preferably greater than or equal to about 60:1.

There are no limitations on how early the sorbitol can be added, though it is usually added after the gum base and the corn syrup have been initially mixed.

It is believed that the sorbitol is enrobed by the gum base when it is mixed at this early stage of the process. As a result, the rate at which the gum attracts moisture is reduced. Hence, during the first 24 hours after mixing, the gum does not soften to the point where it cannot be handled and wrapped without distortion. However, after a period of time, the gum reaches equilibrium and maintains non-staling.

Because of the strong humectant properties of glycerin, the glycerin content of gum composition of the present invention should not exceed about 2%. Above these levels, it is believed that the effect of the powdered sorbitol would be masked, and other characteristics of the gum, modified due to a higher glycerin content, would make the benefits of the invention immaterial.

The level of trim gum may go up as high as 40% of the total composition. The trim gum will, of course, include sugar. However, its sugar content is disregarded in determining the proper time for sorbitol addition. In other words, if 20% of the total composition is trim gum, which has a 60% sugar content, and the trim gum is added to the mixer before any sorbitol is added, the 12% sugar content provided from the trim gum is not counted, and up to half of the total fresh sugar to be added may be added before mixing the sorbitol. The sugar content in the trim gum is already mixed in the gum base from the trim gum, and so does not block the enrobing of the fresh sorbitol by the fresh gum base.

The preferred embodiment of the improved method is given by Example 1.

EXAMPLE 1

A conventional gum mixer is heated to 120° F. 20 parts by weight of a pelletized gum base are charged to the mixer and the pellets are smeared. 18 parts by weight corn syrup having a 45.5 Baume and at a temperature such that the corn syrup flows and can all be added to the mixer within 2 minutes is next added, along with 0.75 parts by weight of glycerin. All ingredients other then the corn syrup are added at room temperature when charged to the mixer. These ingredients are mixed for 3.5 minutes, at which time 20 parts by weight of powdered sugar and 0.9 parts by weight of powdered sorbitol are added. After mixing has continued another 4 minutes, an additional 20 parts by weight of sugar and 0.75 parts by weight of peppermint flavor are added. Mixing is then continued for an additional 4 minutes, at which time 19.6 parts by weight of sugar are added. After a total mixing time of 17.5 minutes, the composition is discharged from the mixer, rolled and scored. After the scored gum has rested and cooled to room temperature, it is wrapped.

The composition of the present invention comprises, on a weight basis, about 15-35% gum base,
50-80% sugar,
0.25-2% powdered sorbitol,
5-30% corn syrup, and
optional flavor, color and other ingredients.

The gum composition of the invention is further characterized by the fact that the powdered sorbitol is initially enrobed by the gum base, such that for a period of time sufficient to cool the gum to room temperature and to wrap individual servings of gum, the gum does not pick up appreciable moisture from the atmosphere.

The following example gives another composition within the scope of the invention and illustrates the non-staling characteristics provided by the small amount of sorbitol used in the method and composition of the present invention.

EXAMPLE 2

Experimental and control samples of gum were prepared having the following compositions.

|  | Experimental | Control |
| --- | --- | --- |
| Sugar | 59.84 | 60.52 |
| Gum Base | 19.82 | 19.82 |
| Corn Syrup | 18.37 | 18.37 |
| Glycerin | 0.70 | 0.70 |
| Flavor | 0.59 | 0.59 |
| Sorbitol | 0.68 | — |

The experimental gum was produced following the method of the invention, in that the sorbitol was mixed into the composition before more than one half of the sugar was added.

After storage at 35% relative humidity (which is equivalent to a very dry condition), samples were tested on a standard Taber testing machine, which generally measures the force required to bend a stick of gum a certain number of degrees, in this case 15 degrees.

The storage time and Taber values of the gums of Example 2 are described in Table I.

TABLE I

|  | Taber Values | |
| --- | --- | --- |
|  | Experimental | Control |
| 0 days | 50 | 50 |
| 11 days | 73 | 153 |
| 14 days | 80 | 196 |

As can be seen from Table I, the addition of a small amount of sorbitol provided good non-staling properties. This result is surprising, especially since less than 2% sorbitol was used, and the sorbitol was mixed into the gum composition before more than half of the sugar was added, in contrast to Witzel's disclosure.

Modifications to the above detailed embodiments of the invention may be made without departing from the invention. For example, aqueous softeners other than corn syrup, such as hydrogenated starch hydrolysate syrups, may be used so long as they have a similar effect on the initial softness and long term softness of the composition. Some of the additional ingredients which may be used include artificial sweetening agents, encapsulated or spray dried flavors, flavor and texture modifiers, color and pharmaceutical agents. The mixing schedule may be varied, so long as the required timing of sorbitol and sugar additions are maintained.

Because these and other modifications can be made, it is intended that the foregoing detailed description be regarded as illustrative, rather than limiting, and that the following claims, including all equivalents, define the scope of this invention.

We claim:

1. In a method of producing a chewing gum composition comprising the steps of mixing about 15 to about 35 parts by weight of a gum base with about 50 to about 80 parts by weight sugar, about 5 to about 30 parts by weight corn syrup, effective amounts of flavor and optional color and other ingredients, the improvement comprising the step of mixing about 0.25 to about 2.0 parts by weight of powdered sorbitol with the gum base prior to mixing more than one half of the sugar into the gum composition.

2. The improved method of claim 1 wherein the powdered sorbitol is mixed with the gum base prior to mixing more than about one third of the sugar into the gum composition.

3. The improved method of claim 1 wherein the gum composition comprises less than about 2 parts by weight glycerin.

4. The improved method of claim 1 wherein the corn syrup and gum base are first mixed together and one third of the sugar and the powdered sorbitol are mixed into the composition after the corn syrup and gum base are mixed together and before any additional sugar is added to the mixer.

5. The improved method of claim 1 wherein the powdered sorbitol comprises about 0.5 to about 1.25 percent of the gum composition.

6. The improved method of claim 1 wherein the powdered sorbitol comprises about 0.65 to about 0.95 percent of the gum composition.

7. A method of producing a chewing gum composition with non-staling and improved wrappability properties comprising the steps of:
  (a) providing a chewing gum composition mixer;
  (b) adding 15 to 35 parts by weight of a gum base to said mixer;
  (c) providing 0.25 to 2.0 parts by weight powdered sorbitol and 50 to 80 parts by weight sugar;
  (d) mixing said sugar and said sorbitol in said mixer with said gum base such that all of said powdered sorbitol is mixed with said gum base before more than half of said sugar is mixed with said gum base;
  (e) mixing additional ingredients with the gum base to provide a chewing gum composition;
  (f) forming the chewing gum composition into individual pieces and;
  (g) wrapping said pieces.

8. The method of claim 7 wherein all of said powdered sorbitol is mixed with said gum base before more than one third of said sugar is mixed with said gum base.

9. The method of claim 7 wherein the gum composition is rolled and scored after being mixed, and is allowed to cool to room temperature before being wrapped.

10. The method of claim 7 wherein the ratio of sugar to powdered sorbitol is greater than about 30:1.

11. The method of claim 7 wherein the ratio of sugar to powdered sorbitol is greater than or equal to about 60:1.

12. The method of claim 7 wherein up to about 40 parts by weight of trim gum are mixed into the gum composition.

13. A chewing gum composition comprising, by weight, about:
  (a) 15 to 35 percent gum base;
  (b) 50 to 80 percent sugar;
  (c) 0.25 to 2 percent powdered sorbitol;
  (d) 5 to 30 percent corn syrup; and
  (e) optional flavor, color and other ingredients, and wherein the powdered sorbitol is initially enrobed by the gum base.

14. The composition of claim 13 wherein the powdered sorbitol comprises about 0.5 to about 1.25 percent of the composition.

15. The composition of claim 13 wherein the powdered sorbitol comprises about 0.65 to about 0.95 percent of the composition.

16. The composition of claim 13 wherein the enrobing of the sorbitol prevents the sorbitol from acting as a humectant with respect to picking up appreciable moisture from the atmosphere until after a time period sufficient for cooling and wrapping individual servings of the gum composition.

17. A chewing gum composition produced by the method of claim 1.

18. A wrapped chewing gum product produced by the method of claim 7.

* * * * *

UNITED STATES PATENT AND TRADEMARK OFFICE
CERTIFICATE OF CORRECTION

PATENT NO. : 4,824,680
DATED : April 25, 1989
INVENTOR(S) : Kevin J. Bernatz et al.

It is certified that error appears in the above-identified patent and that said Letters Patent is hereby corrected as shown below:

On the cover sheet under the heading "Assignee," after "Wrigley" please delete ",".

IN THE DETAILED DESCRIPTION OF THE
INVENTION OF ITS PREFERRED EMBODIMENT

In column 3, line 5, after "non-staling" please insert --characteristics--.

Signed and Sealed this

Sixteenth Day of April, 1991

Attest:

HARRY F. MANBECK, JR.

*Attesting Officer*   *Commissioner of Patents and Trademarks*